United States Patent
Wunderlich et al.

(10) Patent No.: US 11,697,115 B2
(45) Date of Patent: Jul. 11, 2023

(54) METHOD AND DISPENSING DEVICE FOR DISPENSED FLUID OUTPUT

(71) Applicant: Festo SE & Co. KG, Esslingen (DE)

(72) Inventors: Bengt Erich Wunderlich, Ostfildern (DE); Bernhard Vogt, Tubingen (DE); Duc-Thang Vu, Esslingen (DE)

(73) Assignee: FESTO SE & CO. KG, Esslingen (DE)

(*) Notice: Subject to any disclaimer, the term of this patent is extended or adjusted under 35 U.S.C. 154(b) by 1241 days.

(21) Appl. No.: 16/129,930

(22) Filed: Sep. 13, 2018

(65) Prior Publication Data
US 2019/0083982 A1    Mar. 21, 2019

(30) Foreign Application Priority Data
Sep. 21, 2017  (DE) .......................... 102017216713.0

(51) Int. Cl.
*B01L 3/00*     (2006.01)
*G01N 35/10*    (2006.01)
*G01F 11/28*    (2006.01)

(52) U.S. Cl.
CPC ..... *B01L 3/502715* (2013.01); *B01L 3/50273* (2013.01); *G01F 11/28* (2013.01); *G01N 35/10* (2013.01); *B01L 2300/0809* (2013.01); *B01L 2300/0864* (2013.01); *B01L 2300/0877* (2013.01)

(58) Field of Classification Search
CPC .......... B01L 3/502715; B01L 3/50273; B01L 2300/0809; B01L 2300/0864; B01L 2300/0877; B01L 3/0293; G01N 35/1009; G01N 35/10; G01F 11/38; G01F 11/28; G01F 15/001; G01F 15/005
See application file for complete search history.

(56) References Cited

U.S. PATENT DOCUMENTS

| | | |
|---|---|---|
| 3,735,902 A | 5/1973 | Zindler |
| 4,810,659 A | 3/1989 | Higo et al. |
| 5,713,486 A | 2/1998 | Beech |

(Continued)

FOREIGN PATENT DOCUMENTS

| | | |
|---|---|---|
| CN | 105792938 A | 7/2016 |
| DE | 2534260 | 7/1975 |

(Continued)

OTHER PUBLICATIONS

European Seach Report dated Feb. 12, 2019.

*Primary Examiner* — Samuel P Siefke
*Assistant Examiner* — Henry H Nguyen
(74) *Attorney, Agent, or Firm* — Hoffmann & Baron, LLP

(57) ABSTRACT

A dispensing device which has a dispensing channel extending between a supply opening and an output opening into the course of which a pump, a selection valve and a dispensing valve are connected. The selection valve is also connected to a pressurised air source. The dispensing device allows a dispensed output of a fluid, wherein a buffer channel portion is filled by the pump in a pump dispensing phase, to which buffer channel portion pressure is applied from the pressurised air source during a pressurised air dispensing phase such that a precise fluid output is subsequently possible by clocked actuation of the dispensing valve until the target fluid amount has been reached.

1 Claim, 1 Drawing Sheet

(56) References Cited

U.S. PATENT DOCUMENTS

| | | | |
|---|---|---|---|
| 7,303,728 B2 | 12/2007 | Boillat et al. | |
| 2009/0325276 A1* | 12/2009 | Battrell | G01N 33/5302 |
| | | | 435/287.2 |
| 2013/0108521 A1* | 5/2013 | Ikushima | G01N 35/1004 |
| | | | 422/509 |
| 2014/0087934 A1* | 3/2014 | Tenreiro | A61M 1/3693 |
| | | | 494/9 |
| 2016/0231345 A1 | 8/2016 | Merzenich et al. | |

FOREIGN PATENT DOCUMENTS

| | | |
|---|---|---|
| DE | 2534260 A1 | 2/1977 |
| DE | 10103361 A1 | 8/2002 |
| DE | 102005042302 | 3/2007 |
| DE | 102016200960 | 7/2017 |
| EP | 0219102 A2 | 4/1987 |
| EP | 2069070 B1 | 11/2013 |

* cited by examiner

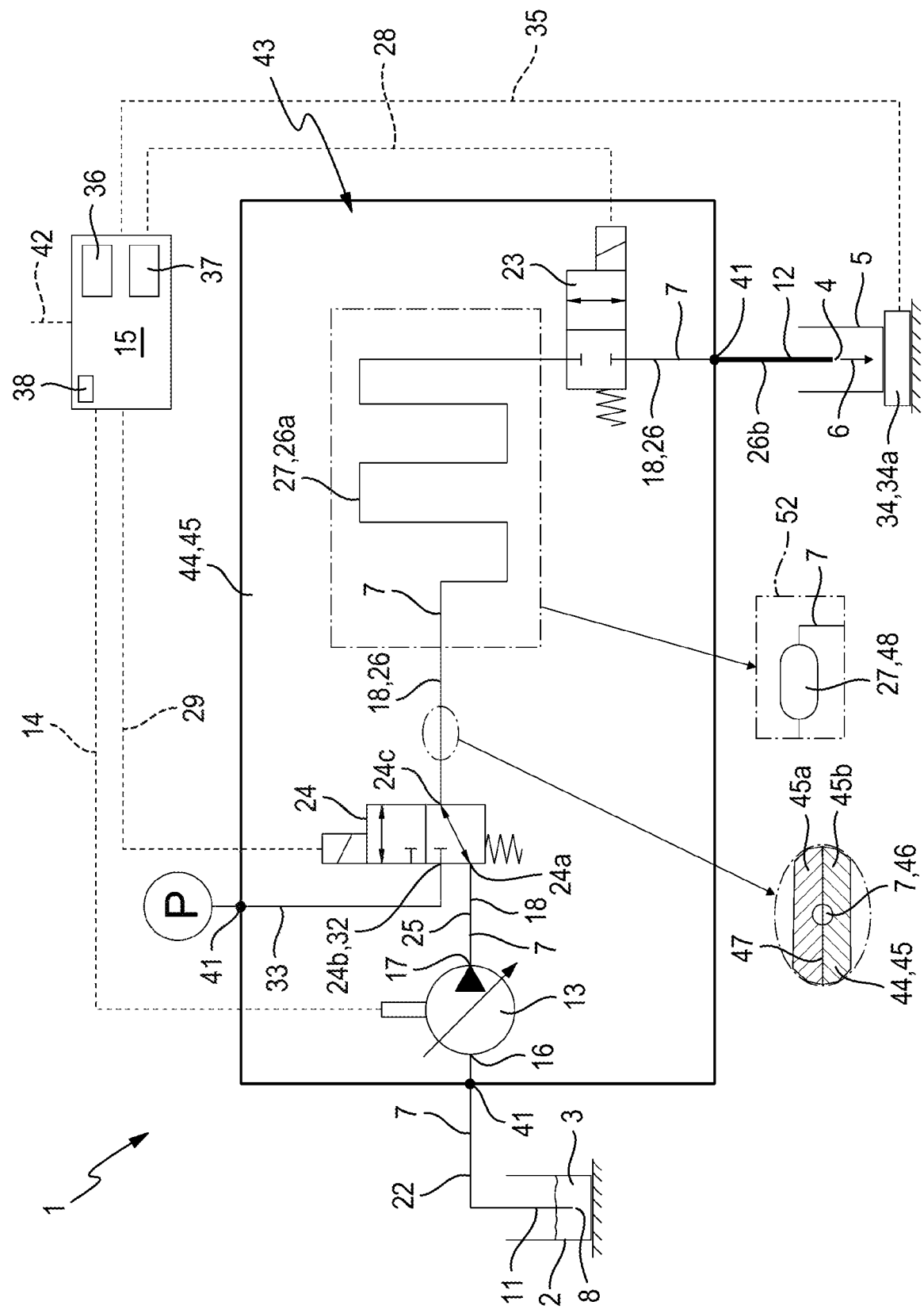

METHOD AND DISPENSING DEVICE FOR DISPENSED FLUID OUTPUT

BACKGROUND OF THE INVENTION

The invention relates to a method for dispensed output of a fluid at an output opening of a dispensing channel of a dispensing device.

The invention also relates to a dispensing device for dispensed output of a fluid, having a dispensing channel extending between a supply opening and an output opening for the fluid to be dispensed, in the course of which is arranged a dispensing valve which is selectively switchable into an open position enabling a fluid passage or into a closed position preventing a fluid passage, and having a pump to supply fluid into the dispensing channel.

A dispensing device designed and operable in this manner, which is known from U.S. Pat. No. 7,303,728 B2, has a dispensing channel consisting in part of a pipeline which, at one end, is connected to a fluid reservoir and, at the other end, ends in an output opening formed on a dispensing needle. The fluid reservoir is partially filled with a transfer fluid and positive pressure or negative pressure can be optionally applied by means of a pump actuatable by an electronic control device. A fluid can be transferred between two containers with the aid of the dispensing device. To this end, the dispensing channel is filled with the transfer fluid by means of a positive pressure generated by the pump, and the dispensing needle is subsequently introduced into the first container. Fluid located in the first container is sucked into the dispensing needle by subsequently switching over the pump into a suction operation and held therein. The dispensing needle is subsequently introduced into the second container and the previously sucked fluid is output into this second container by the pump being switched over into a positive pressure operation. The suction of the fluid into the first container is controllable by a dispensing valve which is connected into the dispensing channel. If the desired amount of fluid is sucked, the dispensing valve is closed. The dispensing valve can be opened to output the sucked fluid into the second container.

A pump device is known from DE 10 2016 200 960 A1 which has a channel module in which a fluid channel system is formed which, at one end, has a suction spear protruding into a fluid reservoir and, at the other end, has an output opening. A pump is connected into the fluid channel system, which pump is capable of sucking fluid contained in the fluid reservoir and outputting it at the output opening.

SUMMARY OF THE INVENTION

The problem addressed by the invention is that of taking measures that allow a dispensed output even of small amounts of fluid with a high degree of accuracy and repeat accuracy.

To solve this problem, a method for the dispensed output of a fluid at an output opening of a dispensing channel of a dispensing device is provided according to the invention, which method is characterised by the following method steps:

(a) outputting a first proportion of a target fluid amount to be output by means of a pump connected into the dispensing channel which pump is sucking the fluid to be dispensed via a supply opening of the dispensing channel from a fluid reservoir, (b) applying pressurised air to a buffer channel portion of the dispensing channel which is upstream of the output opening, which buffer channel portion is separated both from the output opening and from the pump and is filled with fluid sucked by the pump such that the buffer channel portion including a fluid buffer volume confined therein is placed under pressure, and (c) subsequently outputting, in a clocked manner, the remaining proportion of the target fluid amount to be dispensed from the buffer channel portion which is separated from the pump and pressurised by the pressurised air, by means of a dispensing valve arranged between the buffer channel portion and the output opening in the dispensing channel, which dispensing valve is switched alternately into an open position enabling a fluid passage and into a closed position preventing a fluid passage.

In this manner, the fluid to be dispensed is output in a multiphase process sequence, a first dispensing phase being carried out by means of a pump and a subsequent second dispensing phase being carried out alone by a pressure application by means of pressurised air without the involvement of the pump. In the combination of these two dispensing phases, which can be referred to as the pump dispensing phase and as the pressurised air dispensing phase, there is the advantage of being able to dispense both larger and also very small amounts of fluid extremely precisely and with very high repeat accuracy. During the pump dispensing phase, the fluid to be dispensed is sucked via a supply opening into the dispensing channel by means of the active pump from a fluid reservoir, which does not have to be pressurised, and is output at the output opening into a container provided there for example. This may take place at a high delivery rate of the pump and therefore very time-efficiently, the majority of the target fluid amount to be output expediently being output. Preferably 80% to 99.9%, i.e. up to almost 100% of the target fluid amount is output in the pump dispensing phase, in particular 90% of the target fluid amount.

Before the target fluid amount is output, a channel portion of the dispensing channel referred to as the buffer channel portion and separated both from the pump and from the output opening is placed under positive pressure by feeding in pressurised air such that the fluid buffer volume confined in the buffer channel portion is under positive pressure independently of the pump. Smaller fluid amounts are subsequently ejected in pulses at the output opening by a clocked actuation of a dispensing valve connected into the dispensing channel between the buffer channel portion and the output opening until the desired target fluid amount is output. The dispensing valve is switched over alternately between an open position enabling the fluid passage and a closed position preventing the fluid passage. Since the buffer channel portion is under positive pressure, the individual fluid amounts are virtually shot out in particular in drops. The remaining proportion of the target fluid amount output during the pressurised air dispensing phase is at most as large and preferably at least slightly smaller than the fluid buffer volume confined in the buffer channel portion after the pump dispensing phase ends. By way of the method according to the invention, fluids, whether liquid or even gaseous, can be dispensed very quickly and with the highest precision, which opens up a variety of application fields for the method, for example in medical technology or laboratory technology.

Advantageous embodiments of the method according to the invention are listed in the dependent claims.

The actual amount of fluid actually output at the output opening is expediently detected and compared with the target fluid amount to be dispensed, the clocked actuation of the dispensing valve taking place for as long as the detected actual fluid amount corresponds to the target fluid amount. The actual fluid amount can be determined for example by scales or by means of a flow sensor.

As already indicated, the majority of the target fluid amount is expediently already output by the operation of the pump during the pump dispensing phase such that only a small remaining proportion of fluid still has to be output by means of the pressurised air dispensing phase, during which the output rate is very low for the purposes of high precision. 80% to 99.9%, and in particular in the range of 90%, of the target fluid amount is preferably output during the pump dispensing phase by the pump that is delivering in this case.

In the case of the clocked fluid output during the pressurised air dispensing phase, it is advantageous for the opening durations of the consecutive open positions of the dispensing valve to be gradually reduced. This allows very fine dispensing. A first open position is preferably set in the case of the clocked actuation of the dispensing valve, the opening duration of which is longer than the opening duration of each subsequent open positon, the first open position expediently being set such that, during this first open position, 50% to 95%, and in particular at least roughly 90%, of the remaining proportion of the target fluid amount to be dispensed is output.

A somewhat longer output pause is expediently provided between the consecutive open positions. To this end, the closure duration of each closed position of the dispensing valve is selected to be longer than the opening duration of each open position or at least of each open position following the first open position. The longer closure duration promotes the precision of the dispensing operation, in particular when the target fluid amount is detected by weighing because the output fluid has enough time to settle and therefore ensure high weighing accuracy.

As already mentioned, it is advantageous for the buffer channel portion to be designed such that the maximum fluid buffer volume that can be received therein at least substantially corresponds to the remaining proportion, to be output in a clocked manner, of the target fluid amount to be dispensed. As a result, it may be advantageously ensured that the buffer channel portion is at least substantially emptied after a dispensing operation ends.

The method is preferably carried out by means of a dispensing device that has a selection valve arranged in the course of the dispensing channel between the pump and the dispensing valve, which selection valve has a pressurised air inlet connected to a pressurised air source and is selectively switchable into a pump operating position or into a pressurised air operating position, connecting an output channel portion of the dispensing channel, which extends between the selection valve and the output opening, to the pump in the pump operating position and to the pressurised air inlet in the pressurised air operating position. In particular the following method steps are carried out with such a dispensing device:

(a) operating the dispensing device in a pump dispensing phase in which the selection valve is held in the pump operating position when the pump is running and the dispensing valve is in the open position at the same time until the first proportion of the target fluid amount to be dispensed of the fluid sucked via the supply opening is output at the output opening, (b) subsequently operating the dispensing device in a pressurised air dispensing phase, wherein during a first sub-phase of the pressurised air dispensing phase by switching over the selection valve to the pressurised air operating position and by switching over the dispensing valve to the closed position the buffer channel portion of the dispensing channel filled with fluid by the pump during the pump dispensing phase being placed under pressure by feeding in pressurised air, and wherein during a subsequent second sub-phase of the pressurised air dispensing phase subsequent thereto the dispensing valve being switched over in a clocked manner between the open position and the closed position until the remaining proportion of the target fluid amount to be dispensed is output from the buffer channel portion at the output opening.

To solve the above-mentioned problem, a dispensing device of the type mentioned at the outset is preferably designed according to the invention such that the pump is arranged in the dispensing channel between the supply opening and the dispensing valve, and that a selection valve having a pressurised air inlet provided to feed in pressurised air and selectively switchable into a pump operating position or into a pressurised air operating position is arranged in the course of the dispensing channel between the pump and the dispensing valve, which selection valve connects an output channel portion of the dispensing channel extending between the selection valve and the output opening to the pump in the pump operating position and to the pressurised air inlet in the pressurised air operating position.

The above-described method can be advantageously carried out in particular using such a dispensing device.

Advantageous embodiments of the dispensing device according to the invention are also listed in the dependent claims.

The dispensing device expediently contains a fluid reservoir fillable or filled with the fluid to be dispensed, to which reservoir the dispensing channel is connected at the supply opening. One advantage of the dispensing device is that, owing to the pump present, it is not necessary to apply pressure to the fluid reservoir to fill the dispensing channel with the fluid to be dispensed. The filling of the dispensing channel including the buffer channel portion takes place in the pump dispensing phase by the then active pump deploying a suction effect. As a result, a very wide spectrum of use results for the dispensing device, since fluids can also be dispensed which are not provided in fluid reservoirs under positive pressure.

The dispensing device is expediently fitted with an electronic control device which is connected at least to the selection valve and to the dispensing valve, and by means of which the selection valve and the dispensing valve are actuatable in such a way that (a) the selection valve is held in the pump operating position during a pump dispensing phase of the dispensing device when the pump is active, and the dispensing device is in the open position at the same time until a first proportion of a target fluid amount, to be dispensed, of a fluid sucked by the pump via the supply opening is output at the output opening, and (b) following the pump dispensing phase, a pressurised air dispensing phase of the dispensing device is triggered, in which a buffer channel portion of the dispensing channel which is filled with fluid by the pump during the pump dispensing phase and located between the selection valve and the dispensing valve is placed under pressure by feeding in pressurised air independently of the pump during a first sub-phase by switching over the selection valve into the pressurised air operating position and by switching over the dispensing valve into the closed position, and in which the dispensing valve is switched over in a clocked manner between the open position and the closed position during a subsequent second sub-phase until the remaining proportion of the target fluid amount to be dispensed is output from the buffer channel portion at the output opening.

The selection valve and the dispensing valve can be actuated particularly expediently when the dispensing device is fitted with a fluid amount detection device which is capable of detecting the actual fluid amount actually output at the output opening. This fluid amount detection device is expediently also connected to the electronic control device and is capable of supplying the information with respect to the current actual fluid amount to said electronic control device.

Based on the target fluid amount and the information provided by the fluid amount detection device concerning the actual fluid amount, the electronic control device is capable of actuating the selection valve and the dispensing device in coordination with one another in such a way that either the pump dispensing phase or the pressurised air dispensing phase is possible. In this context, it is advantageous for the pump to also be connected to the electronic control device and to be operationally controllable by the electronic control device. This makes it possible in particular for the pump to be deactivated during the pressurised air dispensing phase in order to minimise the energy consumption.

The electronic control device is expediently fitted with electronic comparison means by which it is possible to compare the information received concerning the actual fluid amount with the target fluid amount. The electronic control device is in particular designed such that it ends the clocked actuation of the dispensing valve and holds the dispensing valve in the closed position thereof when the detected actual fluid amount corresponds to the target fluid amount. The pressurised air dispensing phase is then concluded, and a new dispensing operation can follow, which begins in turn with a pump dispensing phase.

Both the selection valve and the dispensing valve are expediently an electrically actuatable multiway valve. Said valves are preferably a solenoid valve or a piezoelectrically actuatable valve respectively. The selection valve is in particular a 3/2-way valve, whereas the dispensing valve is in particular a 2/2-way valve.

The channels required for the use of the dispensing device can readily be formed exclusively by hoses and/or pipelines. However, it is considered particularly expedient when at least one longitudinal portion of the dispensing channel, in particular including the buffer channel portion, is formed in a channel body which simultaneously acts as a support for the pump, the selection valve and the dispensing valve. In this way, particularly short flow paths can be achieved. A dispensing needle having the output opening is expediently fastened to the channel body. The channel body expediently contains two plate-shaped body parts which are placed side-by-side in a joining plane, at least one of the body parts having a groove structure in the region of the joining plane, the relevant longitudinal portion of the dispensing channel being formed by said body part being covered by the other body part.

If the buffer channel portion is provided at least partially with a meandering-shaped longitudinal course, any large buffer volume can be implemented to the narrowest space. Alternatively, the buffer channel portion can also contain a buffer chamber having a diameter that is greater by comparison with the adjacent channel portions.

BRIEF DESCRIPTION OF THE DRAWINGS

The invention will be explained in greater detail below with reference to the accompanying drawing.

FIG. 1 is a schematic view of a preferred structure of the dispensing device according to the invention which is suitable for carrying out a particularly advantageous variant of the dispensing method according to the invention.

DETAILED DESCRIPTION

The dispensing device referred to in its entirety with reference numeral 1 is designed to output a predetermined amount of fluid referred to as the target fluid amount in order to supply said fluid for further use, for example in a laboratory area in medical technology. The fluid amount to be output is also referred to below as the fluid sample. The fluid sample is a partial amount of a fluid 3 provided in a larger amount in a fluid reservoir 2, which is preferably a liquid, in particular an aqueous liquid which can, however, also be present in gaseous form.

The dispensing device 1 is designed to output a plurality of fluid samples one after the other chronologically in a certain sequence, the output taking place through an output opening 4 of the dispensing device 1. The dosed output of the fluid 3 takes place in particular into a suitable receptacle 5, which is for example a vessel or a receiving chamber of a microwell plate.

A fluid output operation taking place through the output opening 4 is indicated in the drawing at 6 by an arrow.

The dispensed fluid output takes place through a dispensing channel 7 of the dispensing device 1. The dispensing channel 7 has a supply opening 8 on the input side, through which the fluid 3 to be dispensed is supplied from the fluid reservoir 2 into the dispensing channel 7. For example, the supply opening 8 is part of a suction needle 11 which dips into the output volume of fluid 3 provided in the fluid reservoir 2. The dispensing channel 7 ends on the output side with the already mentioned output opening 4 which is preferably part of a dispensing needle 12. To output the fluid sample, the dispensing needle 12 is positioned with the output opening 4 thereof above or also in part inside the receptacle 5.

The dispensing device 1 comprises a pump 13 connected into the course of the dispensing channel 7. The pump 13 is electrically actuatable and can receive electrical control signals controlling the operational state thereof via a first control line 14 from an electronic control device 15 which is expediently also part of the dispensing device 1.

The pump 13 is preferably a membrane pump. It has for example a piezo actuator device as the actuation device.

The pump 13 has a pump input 16 fluidically connected to the supply opening 8 and a pump output 17 connected to the output opening 4. When activated, the pump 13 is in a delivery operation and sucks in fluid 3 from the fluid reservoir 2 via the supply opening 8.

The fluid 3 sucked in by the pump 13 enters an output channel portion 18 of the dispensing channel 7 connected thereto via the pump output 17 into, said output channel portion 18 extending from the pump output 17 to the output opening 4. For example, the end portion of the output channel portion 18 opposite the pump 13 extends through the dispensing needle 12.

The fluid connection between the pump input 16 and the supply opening 8 takes place through a suction channel portion 22 of the dispensing channel 7 which extends for example at least partially through the suction needle 11.

By the electronic control device 15, the pump 13 can selectively be set to a deactivated operating state in which said pump does not deliver fluid, or to an activated or active operating state in which said pump sucks and delivers a fluid. The pump 13 is preferably of a construction type that allows a variable setting of the delivery rate in the activated operating state.

In the course of the dispensing channel 7, or more specifically in the course of the output channel portion 18, two preferably electrically actuatable valves are connected which are arranged at a distance from one another in the direction of the course of the channel. Said valves are firstly a dispensing valve 23 and secondly a selection valve 24. The selection valve 24 sits closer to the pump 13 than the dispensing valve 23. The dispensing valve 23 is connected into the output channel portion 18 between the selection valve 24 and the output opening 4.

The selection valve 24 divides the output channel portion 18 into a transition channel portion 25 leading to the pump output 17 and an output channel portion 26 leading to the output opening 4. The dispensing valve 23 sits in the course of the output channel portion 26 and divides the same into a first segment 26a extending between the selection valve 24 and the dispensing valve 23 and a second segment 26b extending between the dispensing valve 23 and the output opening 4. Owing to the particular function thereof, and for better distinction, the first segment 26a is referred to as the buffer channel portion 27.

The transition channel portion 25 may be omitted when the selection valve 24 is attached directly to the pump output 17.

The two valves 23, 24, which are designed in particular as solenoid valves, are actuatable independently of one another by the electronic control device 15 in order to predefine the respectively desired switching position. To this end, the dispensing valve 23 is connected to the electronic control device 15 for control purposes via a second control line 28, and the selection valve 24 via a third control line 29.

The dispensing device 23 is in particular a two-position valve which is switchable alternately into a closed position which can be seen in the drawing and an open position deviating therefrom. In the closed position, the second segment 26b of the output channel portion 26 communicating with the output opening 4 is fluidically connected to the buffer channel portion 27, in the closed position, said segment is separated from said buffer channel portion 27, the buffer channel portion 27 being sealed in a fluid-tight manner at the same time.

The dispensing valve is preferably an electrically actuatable 2/2-way valve.

The dispensing valve 23 is in particular designed as a fast-switching valve such that it can be switched over at a high clock rate between the open position and the closed position. Each switching position can be maintained for as long as desired by corresponding influence by the electronic control device 15.

The selection valve 24 is preferably also a two-position valve which is also designed as a three-way valve. It is preferably an electrically actuatable 3/2-way valve.

The selection valve 24 has a first valve input 24a connected to the pump output 17, a second valve input 24b, the function of which is still to be explained, and a valve output 24c to which the end of the buffer channel portion 27 opposite the dispensing valve 23 is connected.

The second valve input 24b represents a pressurised air inlet 32 which is connected to a pressurised air source P during operation of the dispensing device 1. For example, the dispensing device 1 has a pressurised air supply channel 33 which is connected to the pressurised air inlet 32 and leads to the pressurised air source P. Pressurised air under a positive pressure is provided by the pressurised air source P which is present at the pressurised air inlet 32. The pressurised air source P preferably has a pressure regulator (not shown in greater detail) which ensures the provision of a constant fluid pressure.

The selection valve 24 can be switched and held alternately in two operating positions. A first operating position which can be seen in the drawing is referred to as the pump operating position for better distinction, the possible second operating position is referred to as the pressurised air operating position.

The selection valve 24 connects the pump output 17 to the buffer channel portion 27 in the pump operating position, while the pressurised air source P is also separated. The buffer channel portion 27 is connected to the pressurised air source P in the pressurised air operating position and also separated from the pump 13.

If the pump is activated during the pump operating position of the selection valve 24, it delivers fluid 3 which is sucked from the fluid reservoir 2, into the dispensing channel 7 and through the selection valve 24 into the output channel portion 26. Pressurised air is fed into the output channel portion 26 from the pressurised air source P through the selection valve 24, and this output channel portion 26 is placed under a positive pressure which corresponds to the pressure of the pressurised air source P.

The proportion of fluid 3 which is fed into the buffer channel portion 27 of the output channel portion 26 by the activated pump 13 is referred to as the fluid buffer volume below for better distinction. The amount of fluid buffer volume depends on the size of the cavity which is delimited by the buffer channel portion 27. If the selection valve 24 is switched into the pressurised air operating position at a time when the dispensing valve adopts the closed position, the fluid buffer volume confined in the buffer channel portion 27 is placed under the positive pressure which is applied by the pressurised air source P.

As a further preferred feature, the dispensing device 1 has a fluid amount detection device 34 by means of which the actual fluid amount actually output at the output opening 4 by the fluid output operation 6 is detectable, preferably in a continuous detection operation. The fluid amount detection device 34 is capable of generating electric information with respect to the detected actual fluid amount which is transmitted to the electronic control device 15 via a fourth control line 35 in the case of the embodiment, to which electronic control device the fluid amount detection device 34 is connected.

The electronic control device 15 contains electronic comparison means 36 which are designed to compare the actual fluid amount determined by the fluid amount detection device 34 with the target fluid amount sought for the fluid sample to be output. The electronic control device 15 is expediently fitted with electronic storage means 37 in which the target fluid amount is stored for use by the comparison means 36. The electronic control device 15 is also preferably fitted with input means 38 which allow a variable input of the respectively desired target fluid amount. The electronic control device 15 is further preferably fitted with a communications interface 42 via which it can communicate with a superordinate electronic control unit and which can for example assume the function of the input means 38.

The fluid amount detection device 34 is advantageously designed as scales 34a. This is the case for the illustrated embodiment. The scales 34a support the receptacle 5 during the operation of the dispensing device 1 and can detect the actual fluid amount output into the receptacle 5 in terms of weight by means of a preferably continuous weighing operation and in this respect transmit information to the electronic control device 15.

According to one embodiment (not shown), the fluid amount detection device 34 is formed by a flow sensor device capable of determining the output actual fluid amount by means of the detected flow rate of fluid.

Several components of the dispensing device 1 are preferably combined in one dispensing unit 43 in a space-saving, compact and easy to hold manner. This dispensing unit 43 comprises a support structure 44 which is fitted at least with the pump 13, the dispensing valve 23 and the selection valve 24. The dispensing needle 12 is expediently attached to the support structure 44 in a protruding manner. The dispensing unit 43 can be movable inside the dispensing device 1 so as to be able to position the dispensing needle 12 variably in the region of the respective receptacle 5.

Fluid connections 41 which are accessible from outside are expediently located on the dispensing unit 43 and are used to establish the connection to the supply opening 8, the pressurised air source P and the dispensing needle 12.

According to the embodiment shown, the support structure 44 is preferably designed as a channel body 45 which preferably has a plate-shaped structure. A fluid channel system 46 is formed in the interior of the channel body 45 which at least partially forms the dispensing channel 7. For example, in the channel body 45, aside from two end portions, which define in one case the supply opening 8 and in another case the output opening 4, the entire dispensing channel 7 is formed in the interior of the channel body 45. The fluid channel system 46 preferably also defines a longitudinal portion of the pressurised air supply channel 33.

The channel body 45 preferably comprises two, in particular plate-shaped channel body parts 45*a*, 45*b* which are placed side-by-side in a joining plane 47 and are interconnected in a fluid-tight manner. The fluid channel system 46 extends in the region of said joining plane 47, the relevant channels being formed as a result of a groove structure being introduced in the joining plane 47 into one or both channel body parts 45*a*, 45*b*, which structure is covered by the other channel body part 45*b*, 45*a* in each case such that a channel-shaped hollow structure results, which at least partially forms the fluid channel system 46.

The production of the support structure 44 as a channel body 45 has the advantage that the outlay for tubing and piping is minimised, which reduces the manufacturing costs and allows short flow paths.

The design of the support structure 44 as a channel body 45 also promotes the production of the buffer channel portion 27. This has for example at least partially a meandering-shaped longitudinal course such that a relative long length of the buffer channel portion 27 can be implemented on a small surface. The meandering-shaped portion of the buffer channel portion 27 preferably has a constant cross section over the entire length thereof.

Instead of the meandering-shaped longitudinal course, the buffer channel portion 47 can also contain a buffer chamber 48 which is for example implemented by a longitudinal portion of the buffer channel portion 27 having a larger cross section than the channel longitudinal portions adjoining at both sides. This is indicated in a separately depicted dot-dashed portion 52 in the drawing.

The dispensing device 1 can be operated in a multiphase and in particular in a two-phase manner to output the fluid sample. It is possible for the dispensing device 1 to be operated in a pump dispensing phase and subsequently in a pressurised air dispensing phase. During the pump dispensing phase, the selection valve 24 is switched into the pump operating position and during the pressurised air dispensing phase into the pressurised air operating position.

The pump 13 can preferably be actuated by the electronic control device 15 such that it is deactivated during the pressurised air dispensing phase.

The electronic control device 15 is capable of actuating the selection valve 24 and the dispensing valve 23 based on the comparison results between the predefined target fluid amount and the current actual fluid amount and positioning and holding it in a respectively desired switching position.

A dispensing method for the dosed output of a fluid that can be advantageously carried out using the dispensing device 1 is described below.

When carrying out this method, the supply opening 8 is placed such that fluid suction from the fluid 3 provided in the fluid reservoir 2 is possible through said supply opening. For example, the suction needle 11 is to this end dipped into the fluid 3 provided in the fluid reservoir 2. Pressure is not applied to the provided fluid 3, but rather it is subjected only to atmospheric pressure. In this respect, it is not required for the fluid reservoir 2 to close which is, however, nevertheless expedient for hygienic reasons.

When carrying out this method, the output opening 4 is also placed above or inside the receptacle 5, which in turn is situated on the scales 34*a* of the fluid amount detection device 34. Fluid leaking according to arrow 6 at the output opening 4 is collected by the receptacle 5 and weighed by the scales 34*a*.

The method sequence is controlled and coordinated by the electronic control device 15. It would, indeed, also be readily possible to carry out the individual method sequences individually and for example manually, which is, however, not recommended in the sense of a rational method sequence. Insofar as reference is made below to the performance of certain method steps, these are expediently controlled by the electronic control device 15 connected in the above-explained sense.

When carrying out the advantageous dispensing method, the dispensing device 1 is firstly operated in a pump dispensing phase in which the selection valve 24 adopts the pump operating position, and the dispensing valve 23 adopts the open position. The pump 13 is also activated in this pump operating position such that it sucks fluid 3 from the fluid reservoir 2 via the supply opening 8 and delivers the sucked fluid 3 through the entire dispensing channel 7. In the case of this pump delivery operation, fluid sucked by the pump 13 is output via the output opening 4 as part of the fluid output operation 6 into the receptacle 5.

This pump dispensing phase is carried out for as long as a first proportion of the target fluid amount is output at the output opening 4 that is smaller than the target fluid amount. The majority of the target fluid amount is expediently output during the pump dispensing phase which is preferably more than half and in particular also more than three quarters of the target fluid amount. It has been proven to be particularly expedient for the first proportion of the fluid to be output to be fixed at 80% to 99.9% and in particular at an order of magnitude of roughly 90% of the target fluid amount.

The output of the first proportion of the target fluid amount is monitored by means of the fluid amount detection device 34. The amount of the first proportion of the target fluid amount is stored by means of the electronic storage means 37 and is compared with the currently determined actual fluid amount by the comparison means 36. If the output fluid amount has reached the first proportion of the target fluid amount to be output, the dispensing device 1 is switched over into a pressurised air dispensing phase.

This pressurised air dispensing phase is preferably carried out in two consecutive first and second sub-phases.

The dispensing valve 23 is switched over into the closed position and the selection valve 24 into the pressurised air operating position in a first sub-phase of the pressurised air operating position directly after the pump dispensing phase. Owing to the thus closed dispensing valve 23, the fluid output operation 6 is stopped. At the same time, the buffer channel portion 27 from the pressurised air source P is placed under pressure and consequently also the fluid buffer volume confined in the buffer channel portion.

During the pressurised air dispensing phase, the pump 13 can in principle continue to be active which, however, does not impact the fluid output operation 6 since the pump output 17 thereof is separated from the output channel portion 26 of the dispensing channel 7 by the selection valve 24 located in the pressurised air operating position. For ecological reasons and closure reasons alone, it is, however, expedient for the pump 13 to be kept deactivated during the pressurised air dispensing phase.

The fluid amount of the first sub-phase of the pressurised air dispensing phase is predefined for example in a time-dependent manner by the electronic control device 15, the duration being dependent in particular on the pressure. For example, a pressure sensor can be connected to the buffer channel portion 27 which is connected to the electronic control device 15 and notifies the electronic control device 15 when the fluid pressure provided by the pressurised air source P has built up in the buffer channel portion 27.

Following the first sub-phase of the pressurised air dispensing phase, a second sub-phase of the pressurised air dispensing phase is initiated. This is characterised in that the selection valve 24, as before, adopts the pressurised air operating position, the dispensing valve 23 is, however, switched over in a clocked manner between the open position and the closed position such that a pulse-like fluid output takes place at the output opening 4. During this second sub-phase, the fluid is poured out virtually in drops at the output opening 4 under positive pressure according to arrow 6.

Since during this clocked output of very small fluid quantities, the fluid amount detection device 34 is activated, as before, very accurate monitoring of the rise in the output fluid amount takes place such that the output operation can be stopped very precisely as soon as the actual fluid amount output has reached the desired target fluid amount.

The stopping of the fluid output is caused by the dispensing valve 23 being held in the closed position thereof. No further fluid can therefore flow out of the buffer channel portion 27.

The second sub-phase of the pressurised air dispensing phase thus lasts for as long until the remaining proportion of the target fluid amount to be dispensed resulting from the difference of the target fluid amount and the first proportion of the target fluid amount output during the pump dispensing phase is output at the output opening 4.

The receptacle 5 can only be changed and replaced with a new receptacle 5 which is then in turn filled with the target fluid amount of a fluid sample by means of a new sequence of the outlined dispensing method.

An alternative embodiment is not illustrated in the drawing, in the case of which there is the possibility of locking the buffer channel portion 27 at the input side, after it is placed under positive pressure. To this end, a shut-off valve designed comparably to the dispensing valve 23 can be connected into the output channel portion 26 following the selection valve 24. Alternatively, the selection valve 24 can be designed as a three-position valve which allows a third switching position in which the buffer channel portion 27 is separated both from the pump 13 and from the pressurised air source P. Also alternatively, the selection valve 24 can be implemented by two separate 2/2-way valves of which one controls the fluid connection of the buffer channel portion 27 to the pressurised air source P and the other controls the fluid connection of the buffer channel portion 27 to the pump 13.

In the case of the clocked actuation of the dispensing valve 23 during the pressurised air dispensing phase, the opening duration of the open position of the dispensing valve 23 is expediently gradually reduced. As a result, it is possible to very precisely reach the target fluid amount to be output.

In the case of the clocked actuation of the dispensing valve 23, the opening duration of a first open position is preferably selected to be relatively long such that during this first open position the majority of the remaining proportion of target fluid amount to be output is already output. During this first open position, 50% to 95% and in particular at least roughly 90% of the remaining proportion of the target fluid amount to be dispensed can for example already be output. It is advantageous for the buffer channel portion 27 to be designed such that the fluid buffer volume at most receivable in the said buffer channel portion at least substantially corresponds to the remaining proportion of the target fluid amount to be dispensed that is to be output in a clocked manner. This has the advantage that the buffer channel portion 27 is at least substantially emptied after a dispensing operation ends.

The opening duration of the open positions occurring during the clocked actuation of the dispensing valve 23 is expediently fixedly predefined by the electronic control device 15. The values for the desired opening durations are stored therein.

The clocked operation of the dispensing valve 23 preferably takes place such that the closing duration of each closed position of the dispensing valve 23 is longer than the opening duration of each open position, but at least the first open position. As a result, longer output pauses result between the individual fluid output operations which allow settling of the actual fluid amount already output in the receptacle 5 which positively impacts the detection accuracy.

While the closing duration is for example in the range between 0.3 seconds and 1 second, the opening duration is expediently in the range between 10 and 100 ms.

The dispensing valve 23 is expediently a so-called media separated valve which operates with a membrane as a valve member, the actuation components being separated in a fluid-tight manner from the fluid-conducting regions by the membrane. The same preferably also applies for the selection valve 24.

Very precise dispensing operations can be carried out in a short time by the two-phase dispensing method with a pump dispensing phase and a subsequent pressurised air dispensing phase.

What is claimed is:
1. A method for dispensed output of a fluid at an output opening of a dispensing channel of a dispensing device, the method comprising:
   (a) outputting a first proportion of a target fluid amount to be output by means of a pump connected into the dispensing channel which pump sucks the fluid to be dispensed via a supply opening of the dispensing channel from a fluid reservoir;

(b) applying pressurised air to a buffer channel portion of the dispensing channel upstream of the output opening, which buffer channel portion is separated both from the output opening and from the pump and is filled with fluid sucked by the pump such that the buffer channel portion including a fluid buffer volume confined therein is placed under pressure; and (c) subsequently outputting, in a clocked manner, the remaining proportion of the target fluid amount to be dispensed from the buffer channel portion, which is separated from the pump and pressurised by the pressurised air, by means of a dispensing valve arranged between the buffer channel portion and the output opening in the dispensing channel, which dispensing valve is switched alternately into an open position allowing a fluid passage and into a closed position preventing a fluid passage, wherein the method is carried out by means of a dispensing device which has a selection valve arranged in the course of the dispensing channel between the pump and the dispensing valve, which selection valve has a pressurised air inlet connected to a pressurised air source and is selectively switchable into a pump operating position or into a pressurised air operating position, said selection valve connecting a output channel portion of the dispensing channel extending between the selection valve and the output opening to the pump in the pump operating position and to the pressurised air inlet in the pressurised air operating position, the following method steps being carried out:

(a) operating the dispensing device in a pump dispensing phase in which the selection valve is held in the pump operating position when the pump is running and the dispensing valve is in the open position at the same time until the first proportion of the target fluid amount to be dispensed of the fluid sucked via the supply opening is output at the output opening; and (b) subsequently operating the dispensing device in a pressurised air dispensing phase, wherein during a first sub-phase of the pressurised air dispensing phase by switching over the selection valve to the pressurised air operating position and by switching over the dispensing valve to the closed position the buffer channel portion of the dispensing channel which is filled with fluid by the pump during the pump dispensing phase being placed under pressure by feeding in pressurised air, and wherein during a second sub-phase of the pressurised air dispensing phase subsequent thereto the dispensing valve being switched over in a clocked manner between the open position and the closed position until the remaining proportion of the target fluid amount to be dispensed is output from the buffer channel portion at the output opening.

* * * * *